US012621362B2

(12) United States Patent (10) Patent No.: US 12,621,362 B2
Ingerman et al. (45) Date of Patent: May 5, 2026

(54) SYNCHRONIZING INDEPENDENT MEDIA AND DATA STREAMS USING MEDIA STREAM SYNCHRONIZATION POINTS

(71) Applicant: Akamai Technologies, Inc., Cambridge, MA (US)

(72) Inventors: Mark M. Ingerman, Newton, MA (US); Michael Archer, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 41 days.

(21) Appl. No.: 18/413,448

(22) Filed: Jan. 16, 2024

(65) Prior Publication Data

US 2024/0155019 A1 May 9, 2024

Related U.S. Application Data

(63) Continuation of application No. 17/700,564, filed on Mar. 22, 2022, now Pat. No. 11,876,851, and a continuation-in-part of application No. 16/821,176, filed on Mar. 17, 2020, now Pat. No. 11,503,098.

(60) Provisional application No. 63/228,706, filed on Aug. 3, 2021, provisional application No. 62/953,684, filed on Dec. 26, 2019.

(51) Int. Cl.
| | |
|---|---|
| *G06F 13/00* | (2006.01) |
| *H04L 65/612* | (2022.01) |
| *H04L 65/75* | (2022.01) |
| *H04L 65/80* | (2022.01) |

(52) U.S. Cl.
CPC .......... *H04L 65/764* (2022.05); *H04L 65/612* (2022.05); *H04L 65/80* (2013.01)

(58) Field of Classification Search
CPC ..... H04L 65/764; H04L 65/612; H04L 65/80; H04L 65/61
USPC ......................................... 709/217–219, 231
See application file for complete search history.

(56) References Cited

U.S. PATENT DOCUMENTS

| | | | | |
|---|---|---|---|---|
| 11,503,098 | B2 * | 11/2022 | Archer | ............... H04L 67/141 |
| 11,831,700 | B2 * | 11/2023 | Archer | ............ H04L 65/4015 |
| 11,876,851 | B2 * | 1/2024 | Ingerman | ............. H04L 65/80 |

(Continued)

OTHER PUBLICATIONS

"European Application 22853847.6, extended European search report mailed on Apr. 22, 2025, 13 pages."

(Continued)

*Primary Examiner* — Kenneth R Coulter
(74) *Attorney, Agent, or Firm* — David H. Judson

(57) ABSTRACT

A messaging channel is embedded directly into a media stream. Messages delivered via the embedded messaging channel are extracted at a client media player. In lieu of embedding the message data in the media stream, a coordination index is injected, and the message data is sent separately and merged into the media stream downstream (at the media player) based on the index. In one example embodiment, multiple data streams (each potentially with different content intended for a particular "type" or class of user) are transmitted alongside the video stream in which the coordination index has been injected into a video frame. Based on a user's service level, a particular one of the multiple data streams is released when the sequence number appears in the video frame, and the data in that stream is associated with the media.

8 Claims, 4 Drawing Sheets

(56)     References Cited

U.S. PATENT DOCUMENTS

| 12,168,174 B2 * | 12/2024 | Olabode ............... | A63F 13/537 |
| 2018/0107357 A1 * | 4/2018 | Herigstad .............. | H04N 21/47 |
| 2020/0267441 A1 | 8/2020 | Schwartz et al. | |
| 2022/0203234 A1 * | 6/2022 | Olabode ............... | A63F 13/537 |
| 2023/0421838 A1 * | 12/2023 | Moore .............. | H04N 21/2668 |

OTHER PUBLICATIONS

Coppen, et al., "MQTT Version 5.0, Mar. 7, 2019.", Available at: https://docs.oasis-open.org/mqtt/mqtt/v5.0/mqtt-v5.00-os.pdf.

* cited by examiner

402

500    508

```
<data>
      <priority1>
            <qbfeed>
                  <speed, position, ball speed/throwing arm>
            </qbfeed>
      </priority1>
      <priority2>
            <wrfeed>
                  <speed, position, height, vector, acceleration, 40yard time>
            </wrfeed>
      </priority2>
</data>
```

SYNCHRONIZING INDEPENDENT MEDIA AND DATA STREAMS USING MEDIA STREAM SYNCHRONIZATION POINTS

BACKGROUND OF THE INVENTION

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

Over the last 15 years, live streaming services have grown from novelties and experiments into profitable businesses serving an ever-growing cohort of users. Initial streaming implementations mimicked the workflows of the broadcast world, using custom servers to deliver streams via proprietary protocols. More recently, over-the-top (OTT) live streaming has become ubiquitous and enabled significant growth in volume. One primary factor in the success of OTT delivery solutions was the transition in the mid-2000s to HTTP Adaptive Streaming (HAS), which used standard HTTP servers and TCP to deliver the content, thereby allowing CDNs to leverage the full capacity of their HTTP networks to deliver streaming content instead of relying upon smaller networks of dedicated streaming servers. The two dominant HAS formats are Apple® HTTP Live Streaming (HLS), and MPEQ DASH. HLS traditionally used TS containers to hold muxed audio and video data, while DASH preferred the ISO-Base Media File Format holding demuxed tracks. Accordingly, content owners wanting to reach the diversity of devices have to package and store two sets of files, each holding exactly the same audio and video data. To address this inefficiency, the Common Media Application Format (CMAF) was developed in 2017. CMAF is a restricted version of the well-established fragmented mp4 container and is similar to the DASH-ISO file format. CMAF is a standardized container that can hold video, audio or text data. CMAF is efficient because CMAF-wrapped media segments can be simultaneously referenced by HLS playlists ad DASH manifests. This enables content owners to package and store one set of files.

MQTT (formerly MQ Telemetry Transport) is an ISO standard (ISO/IEC PRF 20922) publish-subscribe-based "lightweight" messaging protocol for use on top of the TCP/IP protocol. In software architecture, publish—subscribe is a messaging pattern where senders of messages, called publishers, do not program the messages to be sent directly to specific receivers, called subscribers, but instead characterize published messages into classes without knowledge of which subscribers, if any, there may be. Similarly, subscribers express interest in one or more classes and only receive messages that are of interest, without knowledge of which publishers, if any, there are. MQTT is designed for connections with remote locations where a small code footprint is required or the network bandwidth is limited. The publish-subscribe messaging pattern requires a message broker. The broker is responsible for distributing messages to interested clients based on the topic of a message.

CDN media customers have been delivering large scale media streams (e.g., live events) for quite some time. They desire to involve end users in a more immersive and interactive experience that keeps the end users engaged with content longer. Example scenarios include, without limitation, quiet period during sporting events, gamifying media experiences with quiz or voting capabilities, and the like. To that end, many customers are in the process of creating an associated bi-directional messaging channel that aims to meet the interactive needs of this type of new media experience. One naïve solution is to deploy existing messaging products and services alongside the media streams to meet these requirements. The challenge, however, is that most messaging products do not scale to the same levels as the media streaming infrastructure that is already built out and mature.

SUMMARY OF THE INVENTION

In one embodiment, this disclosure provides embedding a messaging channel directly into a media stream, where messages delivered via the embedded messaging channel are the extracted at a client media player. An advantage of embedding a message is that it can be done in a single ingest point and then passes transparently through a CDN architecture, effectively achieving message replication using the native CDN media delivery infrastructure.

According to a variant embodiment, and in lieu of embedding all of the message data in the media stream, only a coordination index is injected (embedded), and the message data is sent separately and merged into the media stream downstream (at the client media player) based on the coordination index. In one example embodiment, multiple data streams (each potentially with different content intended for a particular "type" or class of user) are transmitted alongside the video stream in which the coordination index (e.g., a sequence number) has been injected into a video frame. Based on a user's service level, a particular one of the multiple data streams is released when the sequence number appears in the video frame and the data in that stream merge with the media.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF DRAWINGS

For a more complete understanding of the subject matter and the advantages thereof, reference is now made to the following descriptions taken in conjunction with the accompanying drawings, in which.

DETAILED DESCRIPTION OF THE INVENTION

Figure 1:
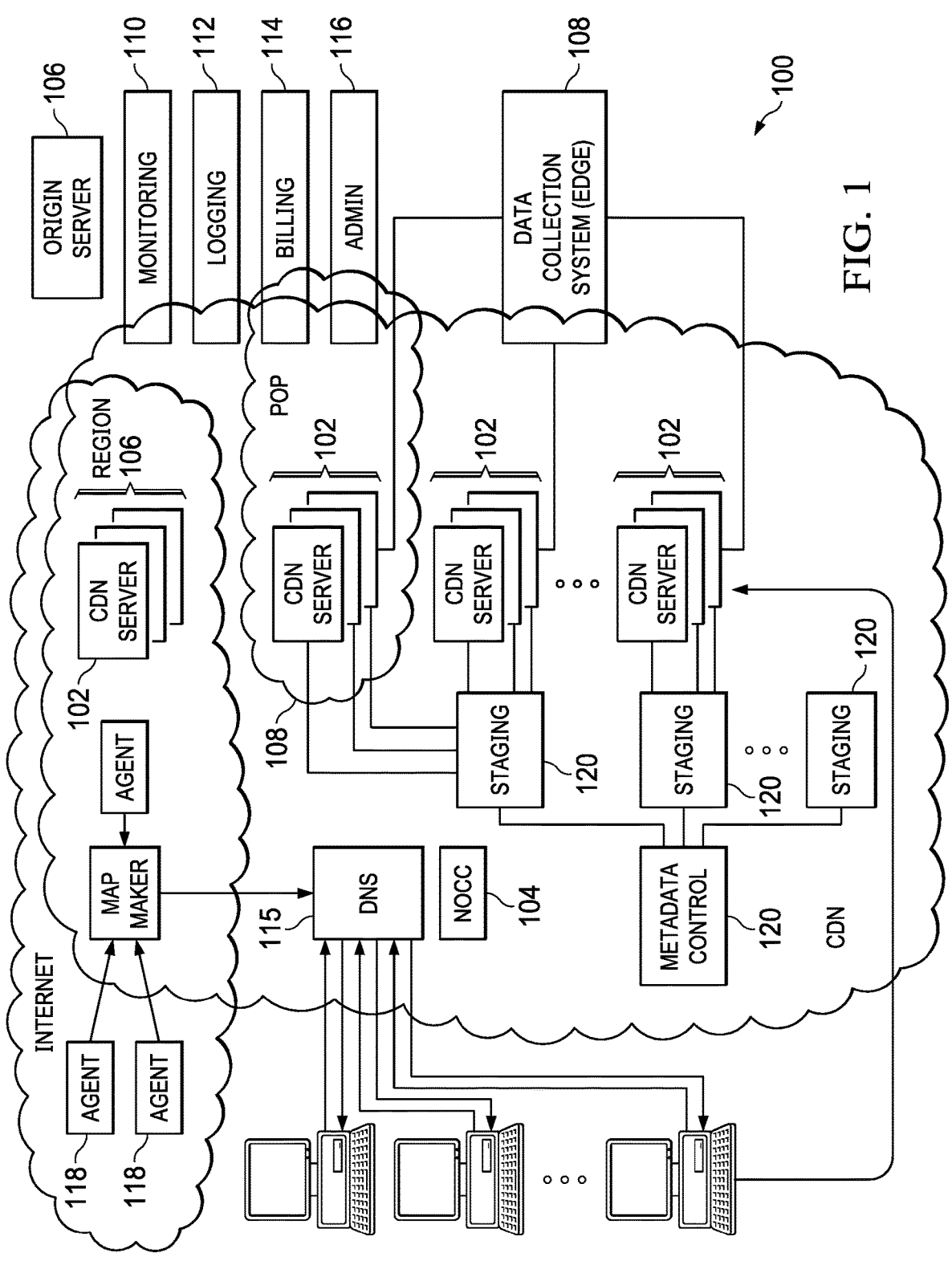
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102*a-n* distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
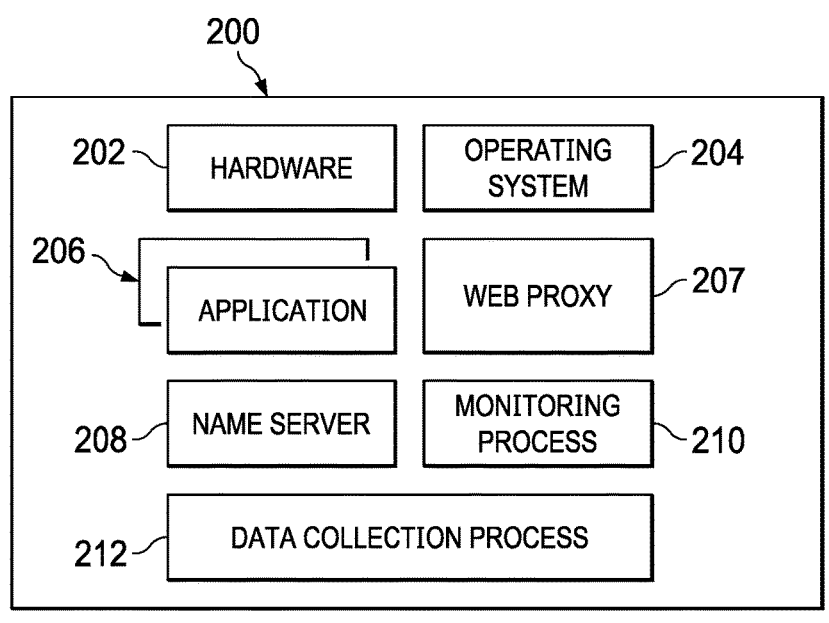
FIG. 2 is a representative CDN edge machine configuration.

As illustrated in FIG. 2, a given machine 200 in the content delivery network comprises commodity hardware (e.g., an Intel Pentium processor) 202 running an operating system kernel (such as Linux or variant) 204 that supports one or more applications 206*a-n*. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine may include one or more media servers, such as a Windows Media Server (WMS) or Flash server, as required by the supported media formats, or it may utilize HTTP-based delivery of chunked content fragments that constitute a stream.

Figure 3:
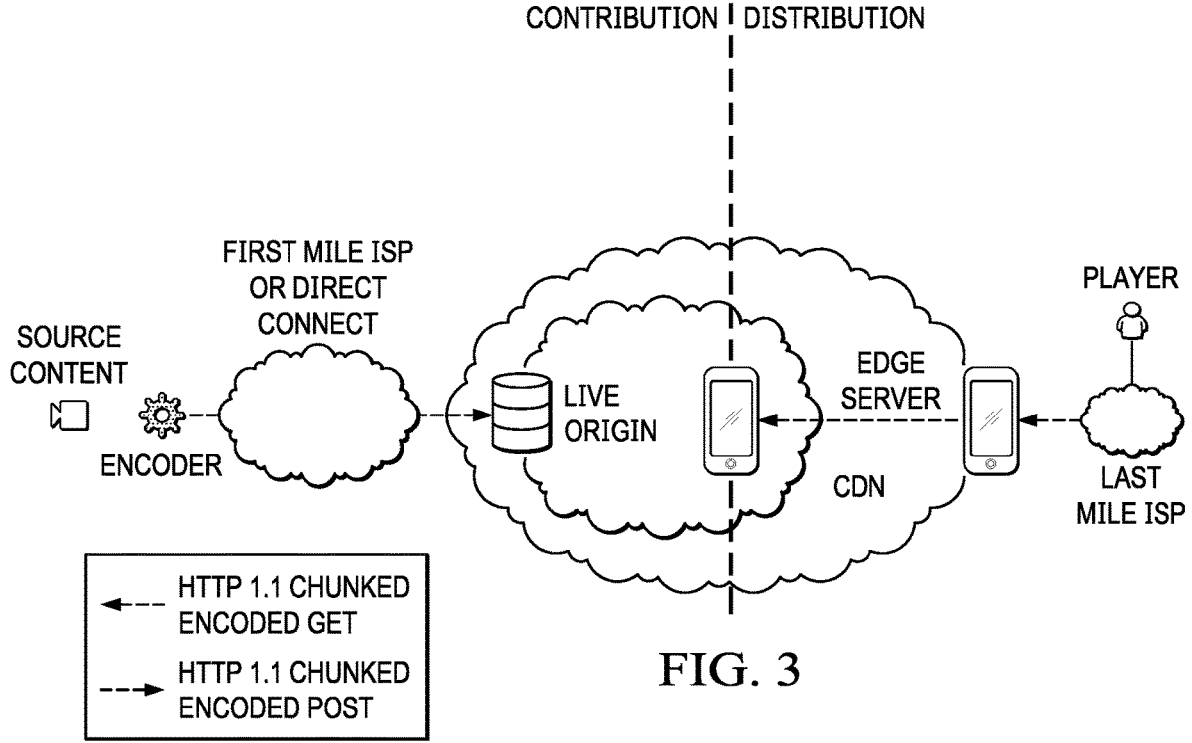
FIG. 3 is a typical ingest and CDN distribution solution.

FIG. 3 depicts a typical CMAF ingest and CDN distribution workflow. The contribution side comprises a source camera, encoder, and a first mile ISP or direct connect network. After capture, the encoder pushes (via HTTP POST) the segments of the captured media to a live origin. A live origin has an ingest layer to accept the content, and a mid-tier layer to present the content for distribution. On the distribution side, a player pulls the content chunks (via HTTP GET) from an edge server, which in turn sources them from the origin. Both of these halves need to work together to transfer the chunks as quickly as possible. Typically, this transfer is done using chunked transfer encoding. In operation, the encode uses HTTP 1.1 chunked transfer encoding to send an encoded CMAF chunk to the origin for redistribution. On the distribution side, the chunk's journey is pull-based and driven by the media player. The media player reads a manifest or playlist, which describes the content, calculates a point (in the media stream) at which it wishes to start playback, and then makes a request for a segment. The player requests a segment and not a chunk, because the chunks are not addressable units typically. When asked for a segment, the CDN edge server returns all the chunks it has for that segment in sequential order using chunked transfer encoding. As more chunks arise from the origin, they are fed to the client until eventually the complete segment has been delivered. The CDN edge also caches the chunks flowing through it to build up a cached representation of the complete segment.

The above-described distribution side works in a similar manner with respect to "on-demand" media, which typically is stored in an origin. The origin may be hosted in a customer's own infrastructure or itself outsourced to the cloud, the CDN, or the like.

Generalizing, a CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Messaging for Live Streaming

Figure 4:
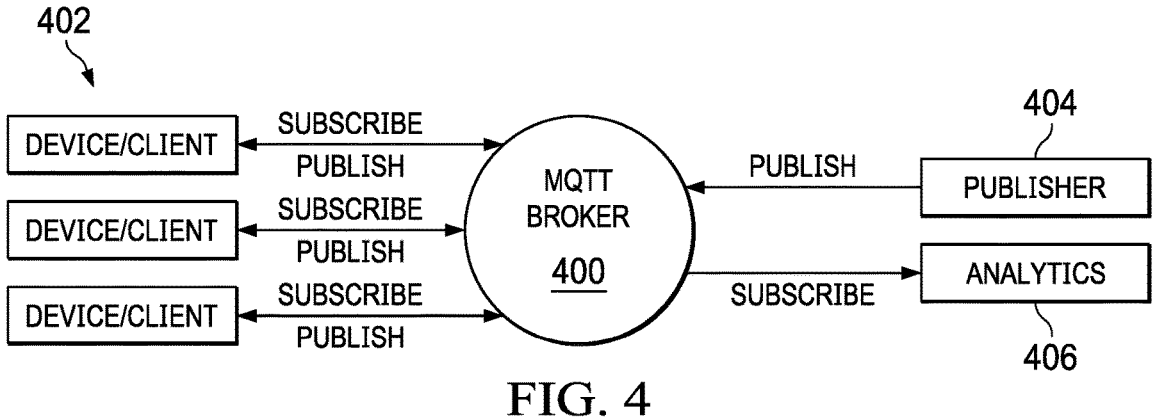
FIG. 4 depicts a MQTT-based system.

As noted MQTT is a highly-efficient protocol for transferring messages between device and applications, as well as cloud services. It was designed initially to support low-powered Internet of Things (IoT) devices, thereby helping to save battery life by using minimal CPU and networking. Due to the efficient nature of the protocol, it is an ideal fit in mobile and cellular devices. As also mentioned, MQTT is a Pub-Sub (Publish Subscribe) protocol that uses a message browser to send messages between clients and groups. FIG. 4 depicts a representative MQTT system, which comprises MQTT broker 400 serving messages to multiple devices/clients 402. In this system, the messages are published by publisher 404, and an analytics service 406 is depicted as a subscriber. The MQTT protocol provides three (3) qualities of service for delivering messages between clients and servers, where QoS is an attribute of an individual message being published; these values are "at most once" (0), "at least once" (1), and "exactly once" (2). An application sets the QoS for a specific message by setting a field to the required value, e.g., QoS0. A subscribing client can set a maximum QoS a server uses to send messages that match the client subscriptions. The QoS of a message forwarded to a subscriber may have a QoS that differs from that given to the message by the original publisher (typically the lower of the values is used to forward a message). For QoS0, the message is delivered at most once, or it may not be delivered at all, and its delivery across the network is not acknowledged; further, typically the message is not stored. The message may be lost if the client is disconnected, or if the server fails.

Figure 5:
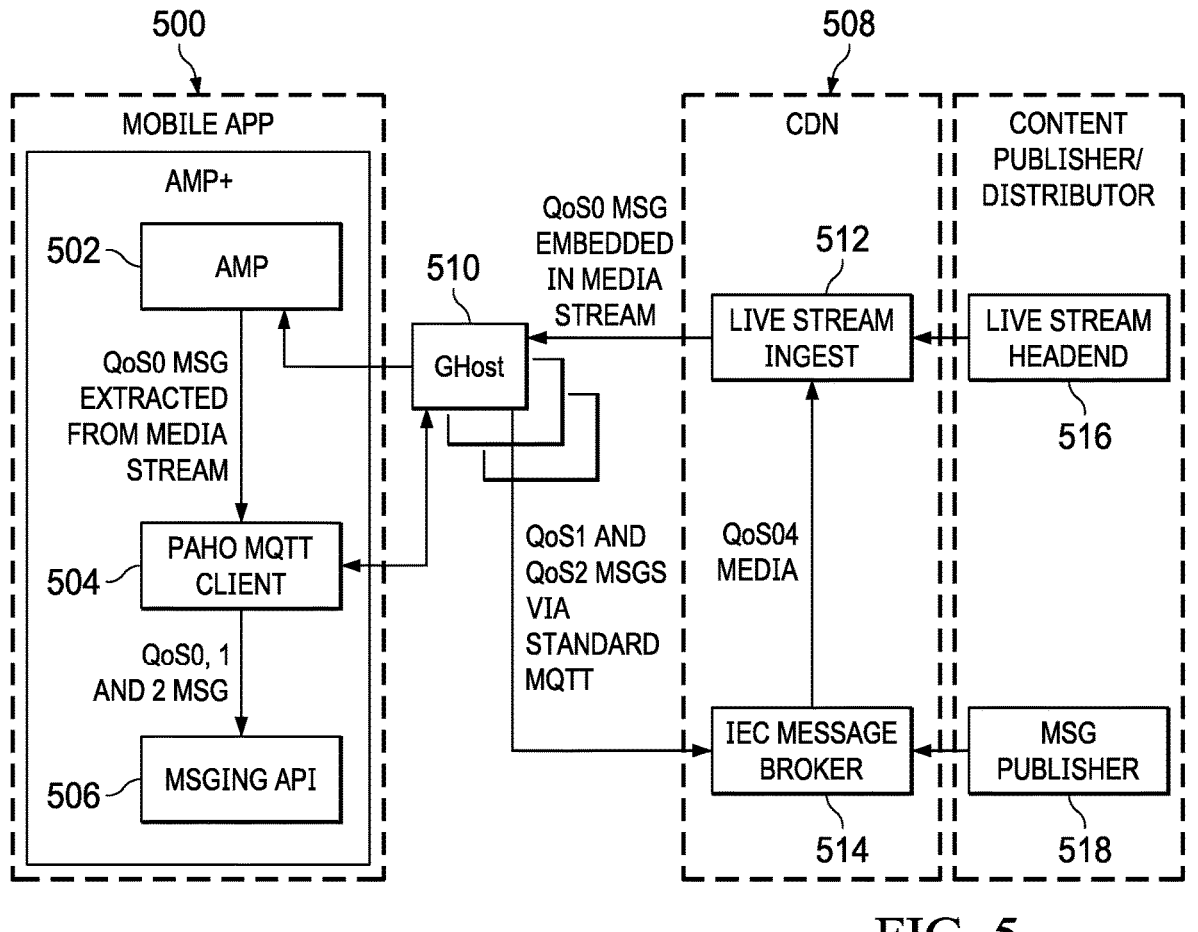
FIG. 5 depicts a system for injecting MQTT messages into a media stream and for delivering the media stream according to the technique of this disclosure.

According to this disclosure, and in lieu of using a separate MQTT system, the approach herein scales MQTT QoS0 (at most once) messaging to end clients (and thus achieves a 'msg broadcast'-like capability) by embedding the message itself within the media stream, and by providing an enhanced media player to extract the message on the client device. FIG. 5 depicts one implementation of this approach. In this example embodiment, an endpoint such as a mobile app 500 executes a media player framework (AMP) 502 together with an MQTT client 504 and API 506. In this embodiment, the MQTT client 504 is a Paho MQTT client. The MQTT client provides for a transparent ingestion of the message received by the mobile app, thereby enabling the messaging to be achieved as if the client had received the message directly from a broker. The CDN 508 comprises the edge servers running the HTTP web proxy (GHost) 510, a live stream ingest component 512, and an IEC message broker 514 (the MQTT broker). As depicted, the live stream ingest component 512 receives the live stream from a source (e.g., via HTTP POST, as previously described), such as live stream headend 516, and the message broker 514 receives the messages published by the message publisher 518. In one embodiment, the message broker 514 receives the QoS message from the publisher 518, and forwards it to the live stream ingest component 512, which in turn embeds the message in the media stream. When the media stream is delivered via the edge server in the manner previously described (e.g., using chunked transfer encoding, via HTTP GET requests, etc.), the message also is delivered to the media player. At the client, the QoS0 message is extracted from the media stream and passed to the MQTT client 504, which consumes it. As also depicted, QoS1 and QoS2 messages received by the edge server may be returned to the IEC message broker for consumption by one or more subscribers (not shown).

Preferably, IEC broker 514 supports a media-enhanced publishing API that allows a CDN customer to specify the message, as well as the media stream URL in which the data should be embedded. The publishing API also enables the customer to specify an MQTT topic and potentially a timestamp when the message should be displayed (or otherwise processed) in the client. Preferably, security and authorization for the service is handled by the IEC broker, by a third party, or by some native CDN system or device. Preferably, the message is embedded within a media container, or via some other approach such as closed captioning, subtitles, SAP capabilities, or the like. An embedded data stream may be bootstrapped onto an existing data structure within HLS and/or MPEG/DASH. Without intending to be limiting, the message size may be modified (reduced) if necessary to avoid unintended latency for the media stream data.

Streaming formats support various methods of injecting metadata into a media stream (a container format), and one or more of these methods may be utilized for the purposes described above. In particular, and according to this approach, the MQTT binary data (e.g., the QoS0 message) is injected into a media stream and, as such, transported to the media player directly. As published, the message may carry with it timing information to further control when the message is to be injected/embedded in the media stream. This is particularly useful in enabling synchronization of the media content with the message content.

There are many potential use cases: real-time quizzing, sports data feeds, video and live augmented reality (AR) gaming, music streaming, general data services, and the like.

The technique depicted provides significant advantages, namely, massive scalability by leveraging the size and scale of the CDN media delivery network. The embedding operation preferably is transparent to the edge server, and the technique provides for media frame level synchronization of media content and messages.

The media stream (or, more generally, content) into which the MQTT message(s) are injected/embedded may be VOD-based, as opposed to live or near-live. The particular messages need not just include QoS attributes. Any type of MQTT message or message attribute may be embedded. Multiple different MQTT messages or message attributes may be embedded into the media stream. The particular manner in which the messages are embedded may vary according to implementation. In one approach, the MQTT QoS0 message is delivered in successive chunks comprising a segment of the media stream. The particular manner in which the message is rendered within or by the mobile application, e.g., as an overlay on a visual display, as an audio (sound) file, etc., will depend on the nature and operation of the application responsible for handling the rendering of the message.

Synchronization of Message and Video Streams; Multi-Stream Video Data Injection

The above-described approach, wherein data (such as message data) is injected into a video stream (e.g., in one or more video frames), and wherein a downstream client separates the data out and provides for the data to be delivered at the same time as the frame in lock stop, provides significant advantages. That said, there may be circumstances wherein this embedding approach is undesirable, e.g., if the data to be embedded is too large (thus bloating the media stream), or where it is desired to have different streams of data for the same video, or where particular data to be embedded is not necessarily required for every user.

For example, consider a scenario where the data to be embedded is large. In typical streaming video protocol handling, if there is too much video data for the available connection bandwidth, then the media player will switch to a smaller stream. In particular, the client media player knows what streams are available, as it receives a manifest at the start of the stream and can dynamically switch between them; in a fragmented stream, the manifest can be updated in real-time. If, however, the message embedding adds too much non-video data into the stream, it may over-burden the connection, which could unintentionally force the video quality to drop. In a worst case, and without some compensating priority mechanism, it is possible that the delivered stream ends up with all data and no video.

As another example, consider a scenario where there are several types of data service, e.g., free, plus, and premium. In such a case, there might be three (3) different data sets, possibly of different sizes, that would need to be injected into the video frames. This complicates provisioning, especially in a situation where most of the data (e.g., for premium subscribers) might be intended for only a very small relative audience.

To address these types of scenarios, according to this variant instead of injecting all of the message data into the video stream, only one or more synchronization points are injected (embedded), and the data stream itself is sent separately from the media. A synchronization point may be a frame number that identifies when a particular portion of the message data stream is to be associated with the media stream (e.g., a particular video frame thereof). Generalizing, the synchronization point(s) (e.g., one or more frame number(s)) serve as a coordination index that in effect controls the media player to associate the data of the separate data stream at one or more points of the media stream. In this use case, the downstream service (e.g., the media player client) is configured to associate the data stream (e.g., portions or pieces thereof) with the proper frames.

Figures 6, 7:
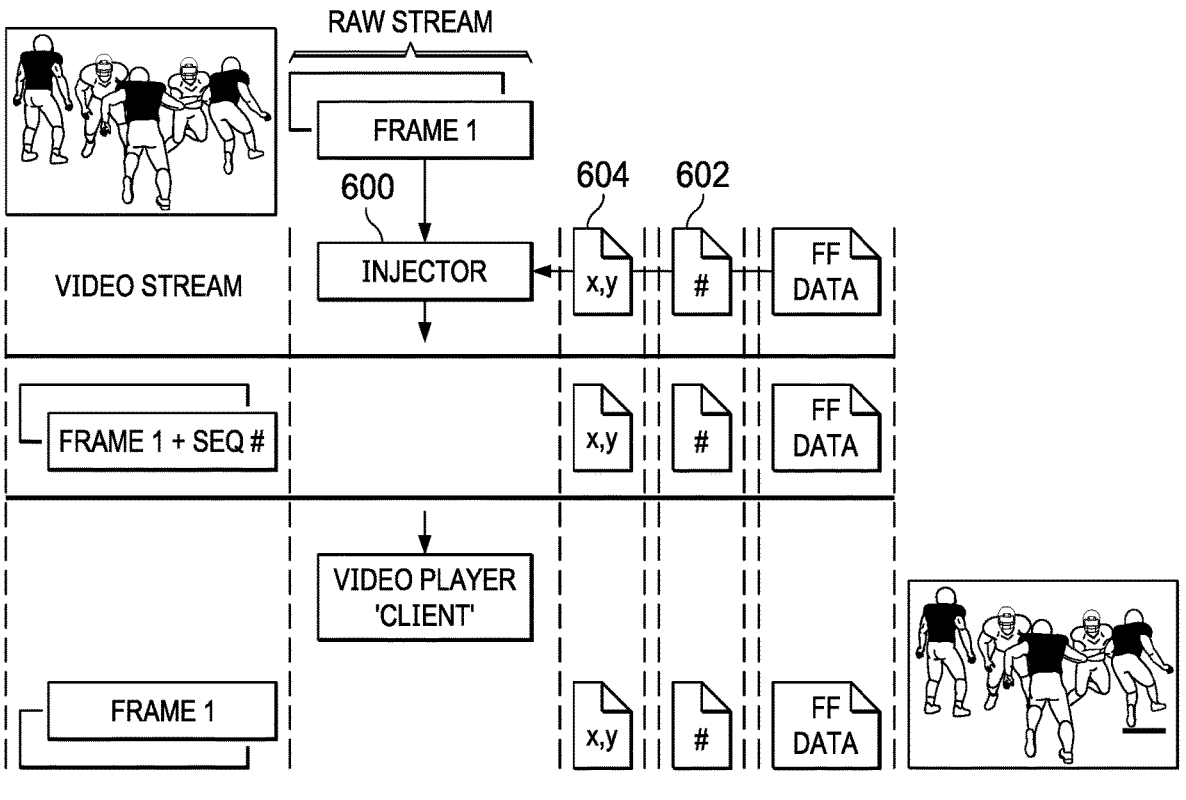
FIG. 6 depicts an example of a variant embodiment of this disclosure wherein, in lieu of embedding all of the message data in the media stream, only a coordination index is injected, and the message data is sent separately and merged into the media stream based on the coordination index.
FIG. 7 depicts an example data description for enabling delivery constraints to be enforced.

FIG. 6 depicts an example scenario for this approach. In this example, which is not intended to be limiting, assume that there are three (3) distinct streams of data that are transmitted alongside the video. In this case, a coordination index, or sequence number, is injected into the video frame, and that same sequence number is used in each of the other streams. As data comes in (e.g., at the ingest point of the CDN), an injector 600 injects the sequence number 602 in the video frame and appends that number to the data in the other streams. Location information 604, e.g., indicating where (e.g., an (x, y) position) data from a data stream is to be positioned in the displayed frame, is also included. Then, and based (for example) on a user's "service level," a different stream (or multiple streams) of data is or are released when the sequence number appears in the video frame.

As depicted in FIG. 6, there may be circumstances where the data streams get ahead of the video stream, as the injection of information into the stream may be computationally-expensive. To maintain synchronization, preferably the downstream client also is configured to hold data in the data stream until the video frame with the proper sequence number is presented by the media player.

Also, because some data may be lost, data can be reproduced in the data stream and the same sequence number can be injected into more than one frame. For example, the injection could instruct the media player to "use this data in the next 4 frames." Consider for example a media stream depicting a player running down field, and there are 24 or 28 frames for every second; if the camera is moving with the player (or not), and the data does not have to be exactly centered over the player, the same exact information can be displayed for 12 or more frames but only sent twice. The media player would then reproduce the effect (rendering of the data relative to the frames) as necessary. If the data is to be rendered for a given time (e.g., several seconds) but also needs to move, then location adjustments (i.e., changes to the (x, y) positions) are delivered as well. For example, to achieve this, the same basic data with location adjustments would be sent multiple times with multiple frame sequence numbers.

Preferably, a mechanism also is provided to enable a content provider (or other permitted entity) to specify what data stream goes with which video stream. The mechanism allows depth of data specification such that a depth of data may be mapped to a particular video encoding stream size. In one embodiment, the mechanism may also enforce an absolute and/or relative constraint support, e.g., for a 2 Mbps, 1080p stream, set a data limit to 100 Kbps or 5%. Available data is then ingested in bulk and then tagged in priority.

FIG. 7 depicts a representation XML-based data specification of this approach. In this example, and continuing with the football game media stream example, assume a quarterback (QB) data feed has a "priority 1," that a wide receiver (WR) data feed has a "priority 2," and so forth. This data can then be mapped to one or more of the media streams. This type of provisioning enables all (or identified portions of the data stream) to be associated with all of some of the media streams. Thus, for example, the priority 1 data feed is mapped to all video streams, the priority 1 and priority 2 data is mapped to video streams of a given quality, e.g., 480p and above, as long as the delivery does not exceed the configured threshold (100 Kps or 5% in this example), and so forth. This provides a multi-stream video data injection solution.

The injector 600 typically is implemented as software configured to execute on a hardware processor. The server on which the injector executes may differ from the server that responds to a particular client request. Thus, a first server running the injector may be used to provision the media stream and its associated data streams with the coordination index, and those streams may then made available to one or more servers (e.g., overlay (CDN) network edge servers) that are responsible for serving these streams when requested. Accordingly, and as used herein, the server-side of the system may execute on one or more servers or server clusters in the network.

Typically, a client includes a browser or mobile application (app), together with an associated media rendering engine (e.g., a media player). The client-side functionality described herein (including, without limitation, determining which of the data streams to use, reading the coordination index, merging the data with the media stream, etc.) may be implemented as browser plug-in, as JavaScript, or as native code.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields including collaboration technologies including videoconferencing, chat, document sharing and the like, distributed networking, Internet-based overlays, WAN-based networking, efficient utilization of Internet links, and the like, all as described above.

The data in the data stream may be delivered as an asynchronous message, or used as metadata/data to enhance the video, e.g., by overlaying one or more video frames with extra data that is available to a particular class of end users such as premiere subscribers.

What is claimed follows below.

The invention claimed is:

1. A computer program product in a non-transitory computer readable medium, the computer program product holding computer program instructions that, when executed by a processor in a host processing system, are configured to:

issue a request for a media stream;

receive the media stream together with a data stream that is distinct from the media stream, the data stream including display data configured to be overlaid on the media stream, together with control information that identifies a given location in the media stream and at least one x-y position in one or more frames of the media stream beginning at the given location;

render the media stream;

as the media stream is being rendered, determine whether the given location in the media stream has been reached; and responsive to a determination that the given location in the media stream is reached, rendering the display data in the one or more frames at the at least one x-y position.

2. The computer program product as described in claim 1 wherein the control information includes a second x-y position.

3. The computer program product as described in claim 2 wherein the computer program instructions are further configured to move the display data from the at least one x-y position to the second x-y position as the display data is rendered.

4. The computer program product as described in claim 1 wherein the media stream is rendered in a media player.

5. The computer program product as described in claim 1 wherein the media stream is configured in a streaming protocol that is one of: HLS, and DASH.

6. The computer program product as described in claim 1 wherein the control information is a sequence number.

7. The computer program instructions as described in claim 1 wherein the control information includes an instruction to render the display data for a given number of sequential frames in the media stream.

8. The computer program instructions as described in claim 1 wherein the control information includes a specification of a media stream delivery bitrate.

* * * * *